Figure 1:
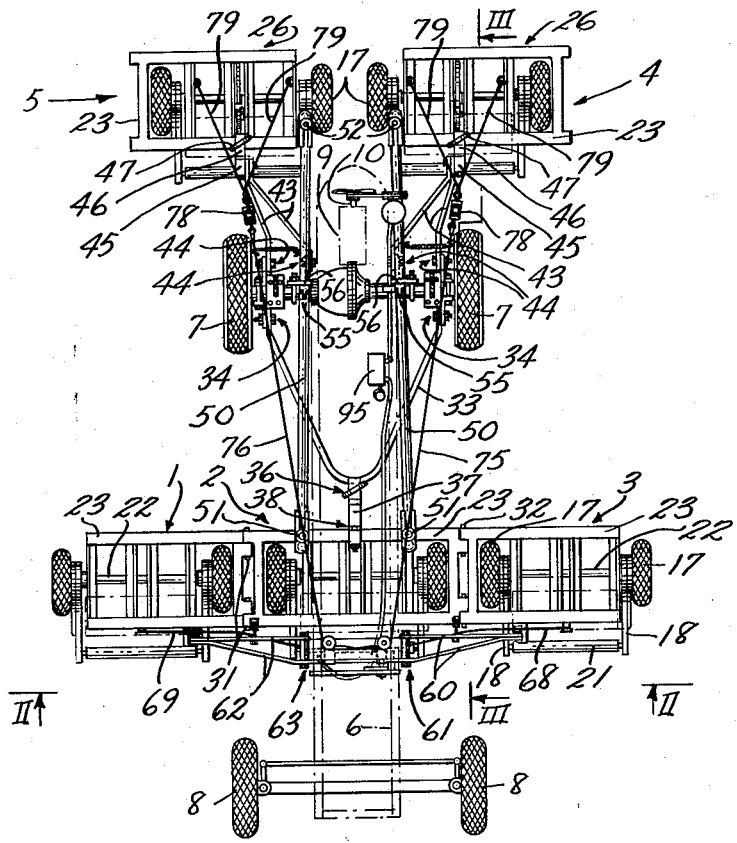

March 16, 1954  R. W. SPEISER  2,672,000
ELEVATING MEANS FOR LAWN MOWERS
Filed July 8, 1950  3 Sheets-Sheet 1

INVENTOR
Ralph W. Speiser
BY
his ATTORNEY

March 16, 1954 R. W. SPEISER 2,672,000
ELEVATING MEANS FOR LAWN MOWERS
Filed July 8, 1950 3 Sheets-Sheet 2

INVENTOR
Ralph W. Speiser
BY
HIS ATTORNEY

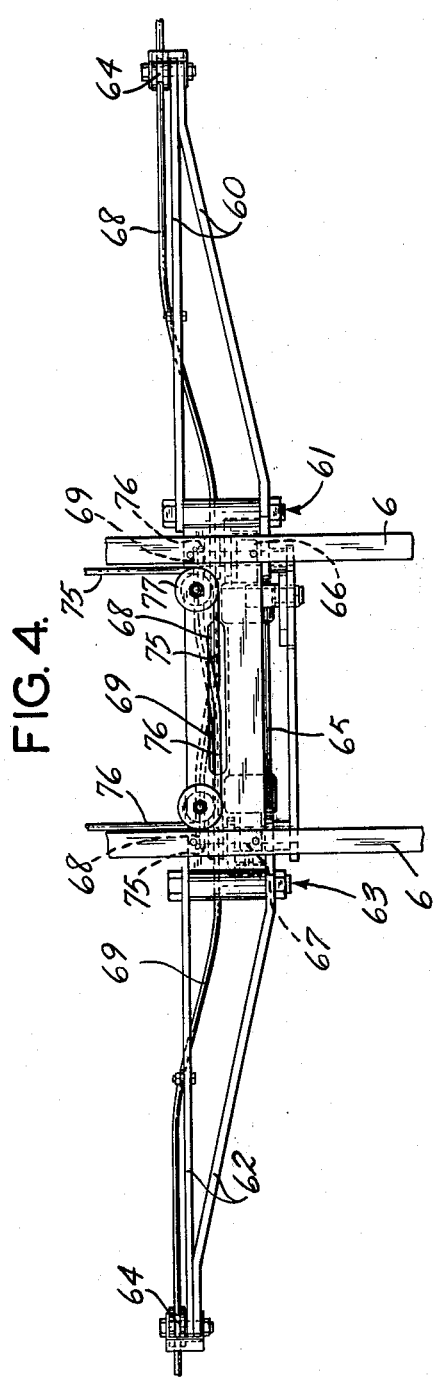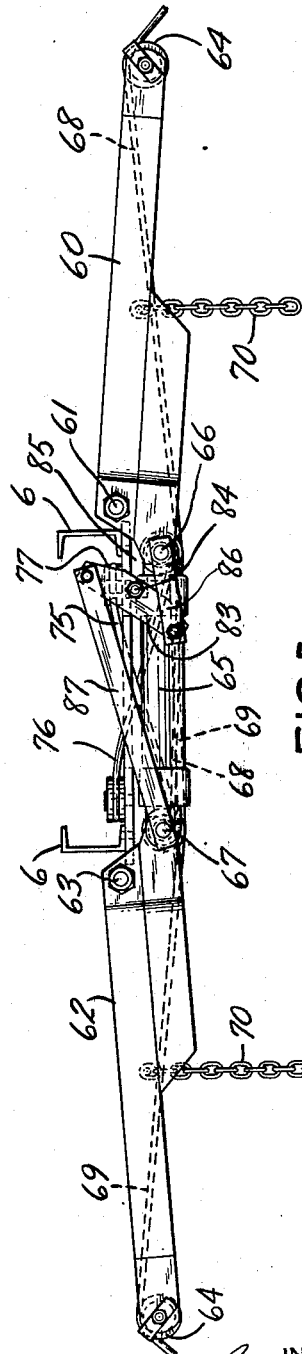

Patented Mar. 16, 1954

2,672,000

UNITED STATES PATENT OFFICE 2,672,000

ELEVATING MEANS FOR LAWN MOWERS

Ralph W. Speiser, Stroudsburg, Pa., assignor to Worthington Mower Company, Stroudsburg, Pa., a corporation of Delaware Application July 8, 1950, Serial No. 172,702

8 Claims. (Cl. 56—7)

This invention relates to lawn mowers, and more particularly to mechanisms for lifting the mower unit or units from the ground when the machine is to be moved from one place of operation to another. It is especially well adapted to gang mowers.

Heretofore various mechanisms have been proposed for this purpose. Speaking generally, the present invention provides an improved arrangement that not only is of general application but also is especially well adapted for gangs of the type where one or more mower units steer, as it were, another or other of the mower units.

In accordance with the invention at least one arm is and preferably two arms are movably connected, preferably by hinging, to a frame which is supported or supportable on the ground independently of the mower units. This frame may be the frame of a tractor whereby the mower or mowers is or are propelled over the ground, although this is not altogether essential. This arm is, or arms are, connected to one or more mower units, and also is connected to a power device arranged to operate the arms at the will of the operator, e. g. swing them in vertical planes, and thereby raise the mower units connected to the arms when desirable. Preferably a motor operated power device is employed, either electrical or fluid, although a hand or foot operated power device can be employed if desired. Preferably the mower unit or units is or are attached to each arm by a cable which runs over the free end of the arm and is itself connected to the power device so that it is drawn over the free end of the arm as the arm is actuated by the power device to raise the attached mower unit or units. This increases the lift over what it would be otherwise with a given arm moving a given distance. The cable can be drawn over the end of the arm to add its lift to that of the arm either before or after the arm itself is actuated to lift its unit or units, or simultaneously with the lifting movement of the arm. Two or more arms can be connected to a single mower or row of mower units, say outwardly toward its ends. Where in such a case the row consists of two or more mowers hinged together (i. e. either two mowers hinged together directly or two mowers hinged to each other indirectly by the intervention of another or other mowers) the row can be prevented from sagging unduly at the joint or joints by connecting one or both arms to the row in the neighborhood of the joint or joints as well as toward the ends of the row. Such an arm arrangement is particularly suitable for a mower or row of mower units placed underneath or projecting from the sides of the frame. In such a case an arm projecting transversely from each side of the frame will serve conveniently to raise and carry the row when needed. On the other hand, when a mower unit or row of units is placed at one end of the frame (that is to say, quite close to or beyond one end of the frame, either front or back), I prefer to hinge either individual or various of the units or the row as a whole to the frame on an axis or axes extending transversely of the frame and displaced fore or aft some distance from the center of the respective units or row, and use cables to turn the unit or units on such axes to raise them from the ground. Where a gang includes mowers placed in both such positions, preferably I use arms for raising the lot underneath or projecting from the sides of the frame and cables with displaced transverse axes for the other lot. Especially when the power device includes an electrical or fluid motor (as I contemplate will be the case at least usually), preferably I float it; that is I mount it so that both reacting sides of it (that is, both the field and the armature of an electric motor, or both the plunger and cylinder of a plunger type fluid motor, etc.) are movable with respect to the frame and connect one side to one or some of the arms and/or one or some of the cables and connect the other side of the motor to the other arm or arms and/or other cable or cables. Usually I connect an equalizing device to the two sides of a floating motor to cause the two sides to move equal distances, or at least proportional distances, simultaneously.

The peculiar adaptability of the invention to those cases where, as it were, some mower units are steered by others, will be observed from the gang mower shown in the accompanying drawings.

Figure 6:
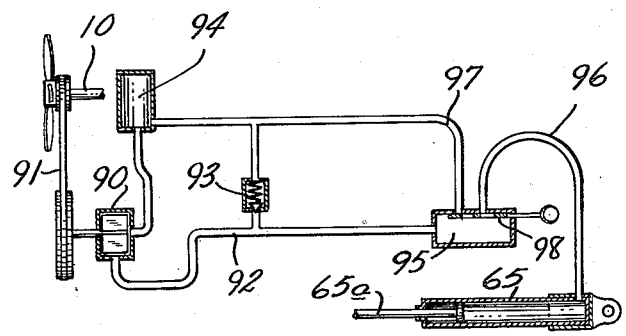
Figure 2:
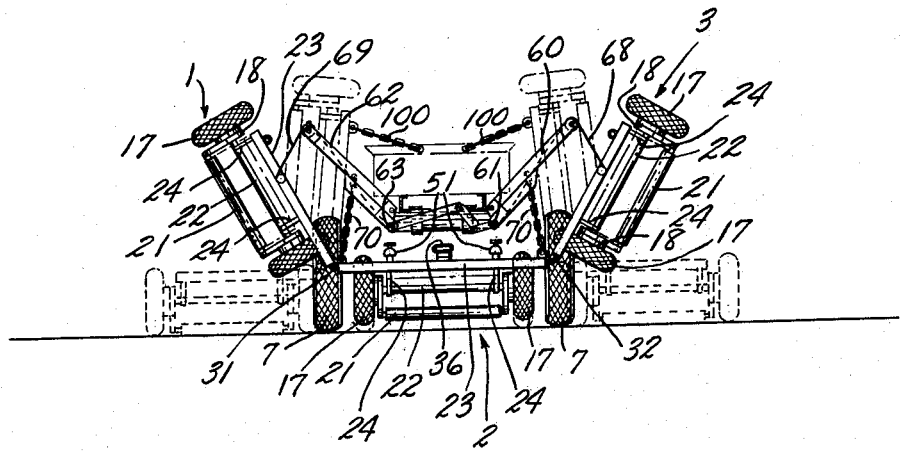
Figure 3:
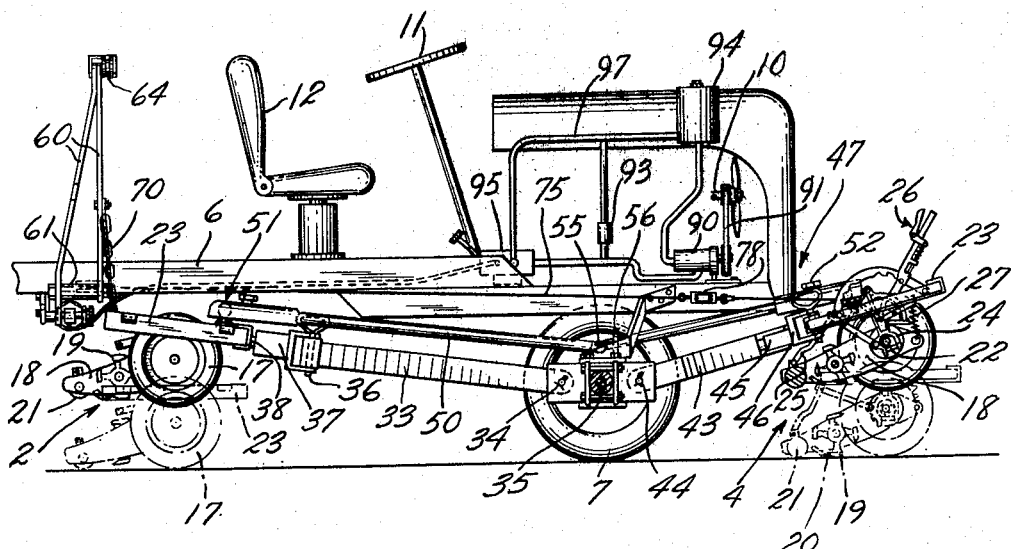

The foregoing and other matters of the invention are illustrated in the accompanying drawings which show one of the various forms which the invention can assume. In those drawings:

Fig. 1 is a plan view of the machine with the mower units in their lower or mowing positions, the tractor which propels the gang being shown, to a considerable extent, only in outline and in broken lines for clarity. Fig. 2 is a sectional elevation about on the line II—II of Fig. 1, the rear mowers being shown partly raised and other of their possible positions being indicated in broken lines. Fig. 3 is a sectional elevation about on the line III—III of Fig. 1, the mowers shown being in their raised positions and their operating positions being indicated by broken lines. Fig. 4, drawn to a larger scale, is a plan view of the arms, power device, equalizer and portions of the primary cables of the machine of the earlier figures. Fig. 5 is an elevation of the same mechanism as Fig. 4. Fig. 6 is a diagrammatic drawing of the hydraulic system by which the mowers are raised and lowered.

In the machine illustrated the various mowers or mower units 1, 2, 3, 4 and 5 of the gang are more or less permanently connected to a tractor by which the gang is propelled. As before indicated, substantially only those parts of the tractor necessary for an understanding of the matter are shown in the drawing. Its frame 6 is supported by its forward wheels 7 and rear wheels 8 of course; in the present instance its forward wheels 7 are also its driving wheels, and it is steered by its rear wheels 8. The tractor engine, by which it is driven, is indicated at 9; the fan shaft of the tractor engine is at 10; 11 is the steering wheel in front of the driver's seat 12. The specific form of the tractor is quite immaterial to the invention however.

Likewise the specific form of the mowers or mower units is immaterial to the present invention. In the present instance the mowers are of a quite conventional form, and while differing from each other in details are so nearly alike that a description of one will serve for all. Each consists primarily of a pair of ground wheels 17 carrying one end of a pair of elongated end members 18, at least on of which is a gear case, a horizontally rotary fly knife 19 and cooperating bed knife 20 mounted between the two end members, gears (not shown) within at least one of the end members 18 by which the ground wheels 17 drive the fly knife 19 as the mower is propelled over the ground, a roller 21 between the rear ends of the end members 18 which may run on the ground during mowing and thus support the rear ends of the members 18 and establish the height of cut, a cross bar 22 joining the opposite (upper) ends of the end members, and a substantially rectangular member 23 mounted by brackets 24 on the cross bar 22 by which the various mowers are connected together and to the tractor. The connection of the brackets 24 to the cross bar 22 is such that the remainder of the mower can be lifted by its connecting member 23. Each mower may be provided with an attachment 25 of some sort, Fig. 3, whereby the rear of the mower is prevented from dropping too far from its connecting member 23 when the mower is raised from the ground; this attachment 25 may or may not be a part of a mechanism indicated generally by 26, Fig. 3, whereby the rear of the mower can be fixed manually at one or more definite distances from its connecting member 23 or even be pressed to the ground during mowing by a spring 27, Fig. 3. It will be recognized that details of the mowers illustrated in some figures of the drawing have been omitted from other figures for clarity.

In the particular machine illustrated the mowers or units 1, 2 and 3 form a unitary row underneath and projecting from both sides of the tractor. I. e. one end of the connecting member 23 of mower 1 is hinged to the adjacent end of the connecting member 23 of the mower 2 on an axis 31 that is longitudinal to the tractor; that is to say, the axis of this hinge extends fore and aft. Likewise one end of the connecting member 23 of the mower 3 is connected by a hinge having a longitudinal axis 32 to the end of the connecting member 23 of the mower 2 which is adjacent to it. This hinging at 31 and 32 permits the three units 1, 2 and 3 to move independently of each other in vertical planes in following the contour of the ground, but otherwise the hinges connect the three mowers to each other substantially rigidly.

A yoke 33 draws this mower row 1, 2, 3 over the ground in mowing. This yoke is hinged at its forward ends on transverse axes 34 to a bracket connected to the forward axle 35 of the tractor, and at its rear end is hinged on a vertical axis 36 to a member 37 which carries a rearwardly projecting cylindrical bar 38. The latter is connected to but rotatable on a longitudinal axis in the center of the forward side of the connecting member 23 of the center mower unit 2. As the bracket 33 drags the rear row of mowers 1, 2 and 3 over the ground in mowing, the vertical hinge joint at 36, being some distance in advance of the mower rows, permits the rear row to turn to the left or to the right as the forces acting on it may direct when the tractor turns or follows a curved path. The hinging at 38 and 34 permits the tractor and the row of mowers to move independently of each other as may be necessary for both to follow the contour of the ground. Also the hinging of the draft bracket 33 at 34 permits this row of mowers 1, 2 and 3 to be raised from the ground at will as will be seen from Fig. 3.

The other two mowers 4 and 5 also form a row, which however is mounted at the forward end of the tractor, Fig. 1. One of these mowers is placed at each side of the longitudinal center line of the tractor. Mower 5 is intended to cut a swath that will be missed by mowers 1 and 2, and mower 4 a swath missed by mowers 2 and 3. Each is connected to the tractor individually by a two-legged bracket 43. The two legs of each bracket 43 are hinged at 44 to the forward axle of the tractor on an axis which is transverse to the tractor. The forward end of each of these brackets carries a journal 45 in which a hinge connection 46 is rotatable on an axis longitudinal of the tractor. The forward end of each connection 46 is hinged to the rear of the connecting member 23 of one of the mowers 4 and 5 on a vertical axis (or more strictly, on an axis which is at right angles to the plane of its connecting member 23). The transverse and longitudinal hinges 44 and 45 permit the tractor and each of the mowers 4 and 5 to follow the contour of the ground independently of each other, and the vertical hinges 47 permit these mowers to turn to the right and left as the tractor turns or follows a curve, all as will be understood. Also the transverse hingings at 44, being displaced by the brackets 43 some distance back of the centers of the mowers 4 and 5, permit these mowers to be raised from the ground at will, Fig. 3.

As pointed out above, the placement of the vertical hinge 36 somewhat in advance of the mower row 1, 2 and 3 permits this row of mowers to follow whatever path the forces acting on it direct. A bar 50 is connected at one end to the row 1, 2, 3 at a point 51 thereon at one side of its vertical hinge 36, and is connected at its other end to the mower 4 at a point 52 thereon at one side of the vertical hinge 47 of the latter, Fig. 1. Each of the joints at 51 and 52 is a universal joint, such as a ball and socket joint, Fig. 3. This bar 50 therefore causes the mower 4 to turn on its vertical hinge 47 whenever the mower row 1, 2, 3 turns on its vertical hinge 36, and through a more or less proportionate angle, and the point 51 is located at such a distance from the vertical hinge 36 and the point 52 is located at such a related side of, and at such a related distance from, the vertical hinge 47 that the mower 4 is caused to cut a swath that is left uncut by the mowers 2 and 3 when the machine is traveling in a curved path as well as when it is traveling straight ahead. A similar rod 50, similarly connected to the mower row 1, 2, 3 and to the other forward mower 5 serves to steer the latter mower in a similar manner with respect to the swath left uncut between the mowers 1 and 2. Each rod 50 can be provided with a horizontally transverse hinge joint 55 near the hinges 34 and 44, say between the hinges 34 and 44, in order to prevent these steering rods interfering with the rising and falling action of the mowers 4 and 5 and the row 1, 2, 3 as the two sets of mowers follow the contour of the ground. As may be necessary to prevent collapsing of a rod 50 at its joint 55 under the forces of steering, a fixed stop can be provided above, or below, or both above and below, each of the joints 55, e. g. as at 56.

The operation of the machine as so far described will be understood from prior practices as well as from the foregoing description. The invention is not limited to it as will be understood.

In accordance with the invention, an arm 60 is hinged on a longitudinal axis 61 to one side of the frame 6 near the mower row 1, 2, 3, and a similar arm 62 is hinged on a similar axis 63 at the opposite side of the frame. Each arm is provided at its free end with a pulley 64 to permit a cable to run freely over the free end of the arm. A power device in the form of a fluid motor consisting of a cylinder 65 and a plunger (65a in Fig. 6) is located between the two arms, one reacting side of the motor, namely the plunger, being connected to one of the arms 60 at 66 a little way from the arm hinge or pivot 61, and the other reacting side, namely the cylinder, being similarly connected at 67 to the other arm 62. The placements of these connections 66 and 67 are such that expulsion of the motor cylinder 65 from its plunger and vice versa, causes the free ends of the arms 60 and 62 to move upwardly as shown in Fig. 5 particularly. The fluid motor is supported by these connections 66 and 67. Accordingly both sides of the motor are movable with respect to the frame 6. The free end of arm 60 is connected to the connecting member 23 of mower 3 by a cable 68 which passes over the pulley 64 of this arm and thence to the opposite side of the fluid motor, namely to the closed end of the cylinder 65 at 67 and there is fastened. Likewise the arm 62 is connected to the connecting member 23 of the mower 1 by a cable 69 which passes over the pulley 64 of arm 62 and thence to its respectively opposite side of the fluid motor, namely to the exposed end of the motor plunger at 66 to which it is fastened. Inasmuch as the cables 68 and 69 connect the oppositely-reacting sides of the power device (i. e., the cylinder 65 and the plunger 66 of the fluid motor) to two points on opposite sides of the center of the mower mechanism consisting of the mower units 1, 2 and 3 (to wit, to a unit 3 toward one end of this mower mechanism and to a unit 1 which is toward the other end of the same mower mechanism), the power mechanism can raise both ends of this mower mechanism simultaneously. Idler pulleys may be used as needed and as will be understood to direct the run of the cables 68 and 69 from the idler pulleys 64 to the ends of the fluid motor.

It will be evident from the foregoing that by forcing fluid (I prefer a liquid, such as an oil) into the cylinder 65 of the fluid motor under pressure and thereby partly expelling the plunger from the cylinder and vice versa, the two arms 60 and 62 can be swung on their hinges or pivots 61 and 63 and thereby the two ends of the mower row 1, 2, 3 raised by this movement. At the same time however, the cables 68 and 69 will be pulled in over the pulleys 64 of the arms and this in itself serves to lift the mower row ends. The total lift of the mower row is of course the sum of these two lifts, or more than the lift would be under the swinging action of the arms alone. In the case of a hinged row, e. g. a row hinged at 31 and 32, usually the action is first to lift the outer ends of the row about its hinges such as 31 and 32, but if the total lift is made great enough the middle of the row also is lifted ultimately as will be understood from Fig. 2. Preferably however I add other cables 70 between the arms and midpoints of the mower row, say near the hinge or hinges, as necessary to prevent undue initial sagging, in the middle. According to the construction in a particular case, such added cables may carry some of the weight of the row in its fully raised position, or they may be entirely relieved of all weight by the cables 68 and 69 when the row has been raised to its highest position.

The forward mowers 4 and 5 are raised to non-operating positions by cables 75 and 76 connected to the power device, and preferably to the opposite reacting sides of any motor employed in it. One end of the cable 75 is connected to the fluid motor cylinder (e. g. at the same point of attachment as the row cable 68, Figs. 4 and 5), and thence passes over such idler pulleys (e. g. 77) as may be necessary, to the forward mower 4. The arrangement is such that this cable passes to the mower 4 from at least some little distance above its transverse hinge 44, Fig. 3. The length of the cable 75 is such that when the cylinder 65 of the fluid motor encloses the plunger to the maximum extent, the mower 4 rests freely on the ground in mowing position as shown by dotted lines in Fig. 3. However, when fluid is forced into the fluid motor and the cylinder is forced back from its plunger, the mower 4 is raised by being turned on its transverse axis 44 by the cable 75, say to its position in Fig. 3. A turnbuckle 78 can be used in the cable 75 for ready adjustment of the cable length from time to time. Also at the mower 4 the cable 75 can be divided, as it were, into a bridle 79 taking hold of the mower at both sides of the axis of its longitudinal hinge at 45, so as to prevent turning of the mower on this axis when raised. But obviously a stop or stops can be added to prevent or limit the degree of the turning of the mower on this longitudinal axis if necessary or desirable. The cable 76 which serves the other forward mower 5 is connected in like manner, except that it is connected to the exposed end of the plunger of the fluid motor, Figs. 4 and 5, instead of to the cylinder 65. It is evident therefore that the mowers 4 and 5 can be raised to non-operating positions together, and lowered again together, and simultaneously with the raising of the mowers of the row 1, 2, 3.

Since both oppositely reacting sides of the fluid motor of the power device, i. e. both the cylinder 65 and the plunger 65a, are movable and no part of it is fixed in position, it may be called a floating motor. I prefer such floating mounting for a motor of the power device, regardless of whether the motor be a fluid motor or otherwise and regardless of the form of the motor, because of the fact that such a mounting permits the motor to deliver power at two points, and, speaking generally, in two directions, and this is peculiarly suited to the remainder of the arrangement of the invention as appears from the above. However, the two reacting sides of a floating motor tend to move unequal distances and at different speeds unless the two sides are loaded exactly equally. To avoid this effect with mower-lifting arrangements such as that described above, I preferably add an equalizer to the construction. Any device or arrangement that will assure simultaneous movement of the two reacting sides of the motor at equal speeds (or at least at determined proportional speeds) can be used. Preferably however I use the equalizer illustrated. This consists of a lever 83 fulcrumed (pivoted) at 84 to a stationary part of the machine, such as a plate 85 fastened to the frame 6 and connected by a pivoted link 86 to the exposed end of the plunger of the fluid motor, say at 66, and connected by another link 87 to the opposite end of the cylinder 65, say at 67. The two arms of the lever 83 are made about equal to each other, and the two links 86 and 87 being connected to the lever at opposite sides of its fulcrum 84, the plunger and cylinder, when moving, are forced to move at about equal speeds and for equal distances, relative to the frame 6.

Fig. 6 illustrates rather diagrammatically a hydraulic system that can be used to feed and control the fluid motor. This system is shown in outline in Fig. 3. As before indicated I use oil as the fluid, by preference. The source of fluid pressure of the system is a centrifugal pump 90 driven by a belt 91 from the shaft 10 of the driving motor of the tractor. A pipe 92 leads the oil from the outlet or high pressure side of the pump to a valve 93 which is urged toward closed position by a spring and so loaded by the spring as to be held closed except when the pressure against it equals or exceeds somewhat the pressure required to thrust the plunger 65a outwardly from the cylinder 65 of the motor in raising mowers. The opposite side of the valve 93 is connected to an oil reservoir 94. The high pressure pipe 92 also leads to a valve 95 subject to control by the operator. For simplicity this has been shown as a slide type of valve. It is connected by a pipe 96 to the cylinder 65 of the fluid motor, and by a pipe 97 to the reservoir 94. The pipe 96 may be a flexible pipe so that the cylinder 65 can reciprocate as described before. The slide 98 controls the flow to the pipes 96 and 97 and also the flow from 96. It is so ported that in one position both the port to pipe 96 and the port to pipe 97 are open; in this position the fluid can flow freely from the pump to the control valve 95 and thence to the reservoir 94 and back to the intake of the pump, and any pressure in the cylinder 65 is released back to the valve 95; accordingly the mowers return to the ground whenever the slide 98 returns to this position and remain on the ground so long as the slide 98 continues in this position. In a second position, the slide 98 closes the port to pipe 97 while holding the port to the cylinder pipe 96 open. In this position, assuming that the tractor engine is running and accordingly that the pump 90 is operating, fluid flows from the pump to the fluid motor cylinder 65 and builds up pressure therein until the plunger of the fluid motor moves outwardly and its cylinder moves in the opposite direction, thereby raising the mowers. As the cylinder and its plunger reach the limits of their movements (which may be established by appropriately located stops, not shown, or by the mowers rising as far as other structure permits) the pressure continues to build up in the motor cylinder 65 until this pressure exceeds the pressure for which the by-pass valve 93 is set; when this occurs this valve 93 opens and allows flow from the pump to the reservoir and accordingly the pressure rises no higher, but continues in the power device motor. By shifting the slide 98 of the control valve to this second position therefore, the mowers can be raised from the ground providing the tractor motor is running. In the third position of the slide, the port to the pipe 96 connected to the fluid motor is closed; the port to the reservoir pipe 97 may be open or it may be closed. In this position the mowers remain in whatever position they may be occupying at the moment; if they are on the ground, they remain on the ground; if they are in raised position, they remain in raised position, even if the tractor motor is stopped and accordingly the fluid pump 90 stops, because the slide 98 in this position traps in the fluid motor cylinder whatever fluid may be in it. If in this position of the slide the port to pipe 97 is closed, the fluid delivered by the pump is returned to the reservoir 94 through the by-pass valve 93; if this port is open however the return is through the control valve 95 and pipe 97, and I prefer that this port be open when the slide is in this third position, because thereby the fluid pump 90 is, or can be, relieved of load except when the mowers are actually in the process of being raised.

The operation of the invention has already been substantially described as the above description of the machine has proceeded part by part. In résumé, the mowers 1, 2, 3, 4 and 5 can be held in their raised positions of Fig. 3 by, in the present instance, the retention of fluid under pressure in the power device motor cylinder 65 by holding the control valve 95 in its third position; the motor cylinder and its plunger act through the arms and cables, as described, in holding the mowers raised. To lower the mowers to the ground for mowing, in the present instance, the control valve is operated to its first position, thereby opening its ports to both the pipes 96 and 97 and thus releasing the fluid pressure in the power device motor and allowing the fluid pump 90 to discharge constantly without building up pressure in the fluid motor. The weight of the mowers then restores them to the ground and holds them there during mowing. Later the mowers can be raised again by shifting the control valve to its second position wherein pressure is again built up in the power device motor and thereby the mowers lifted by action through the arms and cables as described, and then the control valve shifted to its third position wherein the mowers are held elevated and, say, the pump unloaded.

While as before indicated, the mowers can be held in their raised positions for rather long periods by the motor of the power device, it may at times be desirable to lock them raised mechanically. To this end, it is necessary only that the power device motor be locked against reversing. This can be done readily by, for example, chaining the two mowers 1 and 3 in their raised position, as by chains 100 to some convenient part of the tractor.

It will be understood that this invention is not limited to the details of construction and operation described above and shown in the accompanying drawings except as appears hereafter in the claims, and that the claims are intended to include equivalents of the elements mentioned in them as well as those elements themselves.

I claim:

1. A lawn mower having a frame, at least two arms hinged to said frame, a power device connected to said arms to move the same around the hinges of the arms and having two oppositely-reacting sides, and a mower mechanism consisting of at least one mower unit, said mower mechanism being connected, at points on the mower mechanism which are at opposite sides of its center, to said arms for lifting thereby, characterized by the fact that both of the two oppositely reacting sides of the power device are movable with respect to the frame and the two reacting sides of the power device are connected to different arms.

2. A gang mower having a frame, a power device, a mower mechanism consisting of at least one mower unit hinged to said frame on a substantially vertical axis, at least one other mower unit out of alignment with the first mentioned unit and hinged to said frame on a transverse axis displaced from the second mentioned unit and also hinged to the frame on a substantially vertical axis, a steering rod attached to the second mentioned unit and also to said mower mechanism through which one steers the other, arms hinged to the frame and connected to said power device to lift said mower mechanism, and a cable connecting the said power device to the second mentioned unit to turn said unit around said transverse axis and thereby lift the same.

3. The subject matter of claim 2, the second mentioned unit being hinged to the frame on an axis longitudinal to the frame also, characterized by the fact that the steering rod is connected to said second mentioned unit at one side of the center of the unit and a stop to limit the vertical movement of the steering rod is provided to limit the turning of said unit on its longitudinal axis when raised.

4. The subject matter of claim 1, characterized by the fact that an equalizer is connected to the two reacting sides of the power device to cause the two sides to move proportionally to each other.

5. The subject matter of claim 4, characterized by the fact that said equalizer consists of a lever hinged to the frame and connected to the two reacting sides of the power device.

6. A gang mower having a frame, at least two arms hinged to said frame, a power device connected to said arms to move the same around the hinges of the arms and having two oppositely-reacting sides, a mower mechanism consisting of at least one mower unit connected to said arms to be lifted by said arms, at least two mower units out of alignment with the first mentioned unit, each of said two units being hinged to the frame on a transverse axis displaced from the center of the respective unit, a cable for each of said two units to turn the respective unit about its transverse axis, both of the two reacting sides of the power device being movable with respect to the frame and the two being connected to different arms, and the said cables being connected one to one of the reacting sides of the power device and the other being connected to the other of the reacting sides.

7. A gang mower having a frame, a power device both reacting sides of which are movable relative to said frame, at least two mower units connected to said frame, said two units being at opposite sides of the longitudinal center line of the frame and being hinged to the frame on axes extending transversely of the frame and displaced from the centers of the units, and a cable connected to one of said two units and to one reacting side of the power device and a cable connected to the other of said two units and to the other reacting side of the power device to turn said units on said axes to raise said units from the ground.

8. A gang mower having a frame, at least two mower units disposed in a row and connected to the frame on an axis transverse of said frame, at least three mower units in a row out of alignment of first mentioned row of mower units and connected to said frame on an axis transverse of said frame, said mower units of said second mentioned row being connected to each other on axes longitudinal of said frame, a power device both reacting sides of which are movable relative to the frames, at least two arms hinged to the frame on longitudinal axes and connected to said reacting sides of said power device to be turned thereby on their hinges, cables connecting said reacting sides of said power device to said first mentioned mower units to turn said units on said transverse axes, cables connecting said reacting sides of said power device to two outer mower units of said second mentioned mower units to turn said outer units on their longitudinal axes, said second mentioned cables running over free ends of said arms to connect said outer mower units to said arms, cables to connect said arms to an intermediate mower unit of said second mentioned row of mower units to lift the same around said transverse axis, said arms and said cables reacting simultaneously to the movement of the two sides of the power device to lift the mower units.

RALPH W. SPEISER.

References Cited in the file of this patent

UNITED STATES PATENTS

| Number | Name | Date |
|---|---|---|
| 916,762 | McFadden | Mar. 30, 1909 |
| 1,209,519 | Townsend | Dec. 19, 1916 |
| 1,900,726 | Moyer | Mar. 7, 1933 |
| 1,961,710 | Pol | June 5, 1934 |
| 2,058,048 | Worthington | Oct. 20, 1936 |